(12) United States Patent
Onishi et al.

(10) Patent No.: US 11,377,024 B2
(45) Date of Patent: Jul. 5, 2022

(54) TRAVEL ASSISTANCE DEVICE, TRAVEL ASSISTANCE SYSTEM, AND TRAVEL ASSISTANCE METHOD

(71) Applicant: Mitsubishi Electric Corporation, Tokyo (JP)

(72) Inventors: Hiroyuki Onishi, Tokyo (JP); Yuji Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 298 days.

(21) Appl. No.: 16/620,270

(22) PCT Filed: Jul. 14, 2017

(86) PCT No.: PCT/JP2017/025751
§ 371 (c)(1),
(2) Date: Dec. 6, 2019

(87) PCT Pub. No.: WO2019/012690
PCT Pub. Date: Jan. 17, 2019

(65) Prior Publication Data
US 2020/0094732 A1 Mar. 26, 2020

(51) Int. Cl.
*B60Q 1/34* (2006.01)
*G08G 1/00* (2006.01)

(52) U.S. Cl.
CPC ............... *B60Q 1/346* (2013.01); *G08G 1/22* (2013.01)

(58) Field of Classification Search
CPC .................................. B60Q 1/346; G08G 1/22
USPC .......................................... 701/117; 340/465
See application file for complete search history.

(56) References Cited

U.S. PATENT DOCUMENTS 6,356,189 B1   3/2002  Fujimaki

FOREIGN PATENT DOCUMENTS

JP           2000-293791 A    10/2000

*Primary Examiner* — Nadeem Odeh
(74) *Attorney, Agent, or Firm* — Birch, Stewart, Kolasch & Birch, LLP

(57) ABSTRACT

A travel assistance device for assisting traveling of a subsequent vehicle following a vehicle group in the form of vehicle platooning, the travel assistance device being located in a last vehicle of a plurality of vehicles included in the vehicle group, the travel assistance device including: an information acquiring unit for acquiring information indicating right/left turning vehicles that turn right or left at an intersection among the vehicles and information indicating deceleration timing of a first vehicle from front among the right/left turning vehicles; and a direction indicator controlling unit for turning on a direction indicator of the last vehicle at the deceleration timing of the foremost right/left turning vehicle.

12 Claims, 11 Drawing Sheets

TRAVEL ASSISTANCE DEVICE, TRAVEL ASSISTANCE SYSTEM, AND TRAVEL ASSISTANCE METHOD

TECHNICAL FIELD

The present invention relates to a travel assistance device, a travel assistance system, and a travel assistance method for assisting traveling of a subsequent vehicle following a vehicle group in the form of vehicle platooning in the last vehicle of a plurality of vehicles included in the vehicle group.

BACKGROUND ART

In related art, systems for achieving vehicle platooning of a vehicle group including one leading vehicle that travels by being driven by a human and one or more following vehicles that follow the leading vehicle by so-called "automatic operation" have been developed.

Patent Literature 1 teaches a turn signal controller that turns on a turn signal of a following vehicle in response to an operation of a turn signal switch made by the driver of a leading vehicle. This can let the driver of a subsequent vehicle know that the vehicle group in the form of vehicle platooning will turn right or left at the timing when the driver of the leading vehicle turns on the turn signal of the leading vehicle. This also enables the driver of the subsequent vehicle to predict that the following vehicle will decelerate to turn right or left. Thus, the turn signal controller of Patent Literature 1 assists traveling of a subsequent vehicle following a vehicle group in the form of vehicle platooning.

CITATION LIST

Patent Literatures

Patent Literature 1: JP 2000-293791 A

SUMMARY OF INVENTION

Technical Problem

In recent years, with the technological advancement in automatic operation, systems for achieving vehicle platooning in which all of vehicles including a leading vehicle, intermediate vehicles, and a last vehicle travel by automatic operation have been developed. In addition, systems for achieving vehicle platooning in which different departure places are set for different vehicles and which vehicles can freely join at branching points on travel routes have also been developed. Furthermore, systems for achieving vehicle platooning in which different destinations are set for different vehicles and which vehicles can freely leave at branching points on travel routes have also been developed. Thus, such a situation in which, when a vehicle group in the form of vehicle platooning passes an intersection, the vehicles included in the group individually turn right, turn left or go straight ahead at the intersection occurs.

For example, such a situation in which, after a leading vehicle has gone straight ahead at an intersection, an intermediate vehicle turns right or left at the intersection, and a last vehicle goes straight ahead at the intersection occurs. In such situations, the turn signal of the last vehicle is not turned on although the last vehicle will decelerate because of the intermediate vehicle turning right or left. In addition, because the turn signal of the leading vehicle is not turned on, the turn signal of the last vehicle is not turned on even when the turn signal controller of Patent Literature 1 is used. Thus, there have been problems in that it is not possible to let the driver of the subsequent vehicle know that the intermediate vehicle will turn right or left, and in that it is not possible to enable the driver of the subsequent vehicle to predict that the last vehicle will decelerate because of the intermediate vehicle turning right or left.

The present invention has been made to solve such problems as described above, and an object thereof is to provide a travel assistance device, a travel assistance system, and a travel assistance method which, in the vehicle platooning of vehicles which each vehicle can freely leave at branching points on a travel route, enable a driver of a subsequent vehicle to predict that the last vehicle of a plurality of vehicles included in a group of the vehicles in the form of vehicle platooning will decelerate because of at least one vehicle turning right or left.

Solution to Problem

A travel assistance device according to the present invention is a travel assistance device for assisting traveling of a subsequent vehicle following a vehicle group in the form of vehicle platooning in a last vehicle of a plurality of vehicles included in the vehicle group, the travel assistance device including processing circuitry to acquire information indicating right-or-left turning vehicles that turn right or left at an intersection among the vehicles and information indicating deceleration timing of a forefront right-or-left turning vehicle from front among the right-or-left turning vehicles, and turn on a direction indicator of the last vehicle at the deceleration timing of the forefront right-or-left turning vehicle.

Advantageous Effects of Invention

According to the present invention, the configuration as described above allows, in the vehicle platooning of vehicles which each vehicle can freely leave at branching points on a travel route, a driver of a subsequent vehicle to predict that the last vehicle of a plurality of vehicles included in a group of the vehicles in the form of vehicle platooning will decelerate because of at least one vehicle turning right or left.

DESCRIPTION OF EMBODIMENTS

Embodiments for carrying out the invention will now be described with reference to accompanying drawings for more detailed explanation of the invention.

FIRST EMBODIMENT

Figure 1:
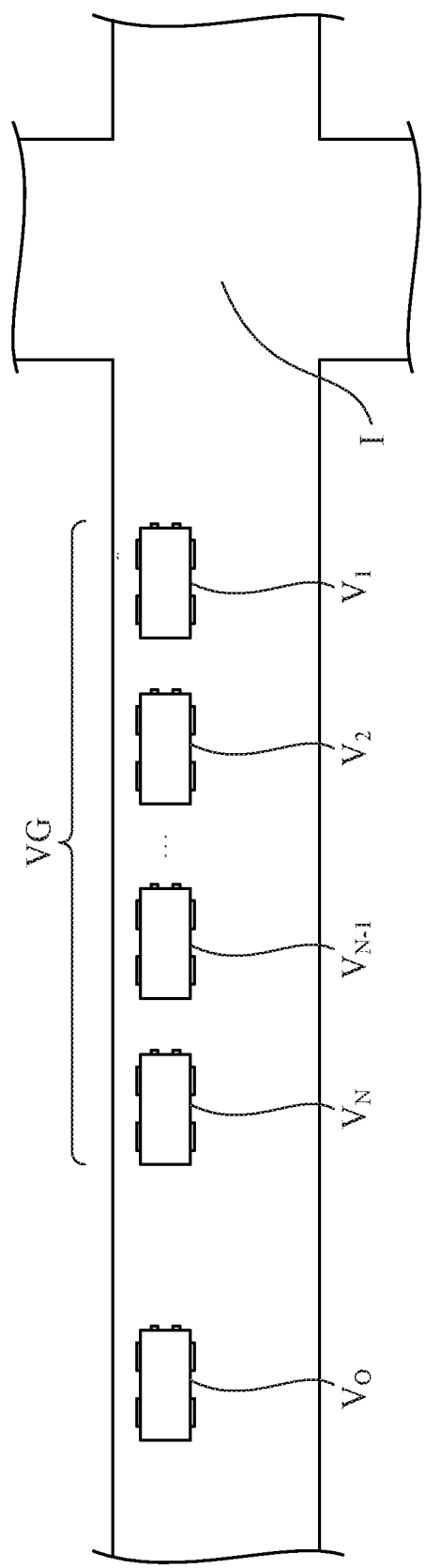
FIG. 1 is an explanatory diagram illustrating positional relations of an intersection, a plurality of vehicles included in a vehicle group in the form of vehicle platooning, and a subsequent vehicle following the vehicle group in a state in which the vehicle group has approached the intersection that the vehicles are going to enter.
Figure 2:
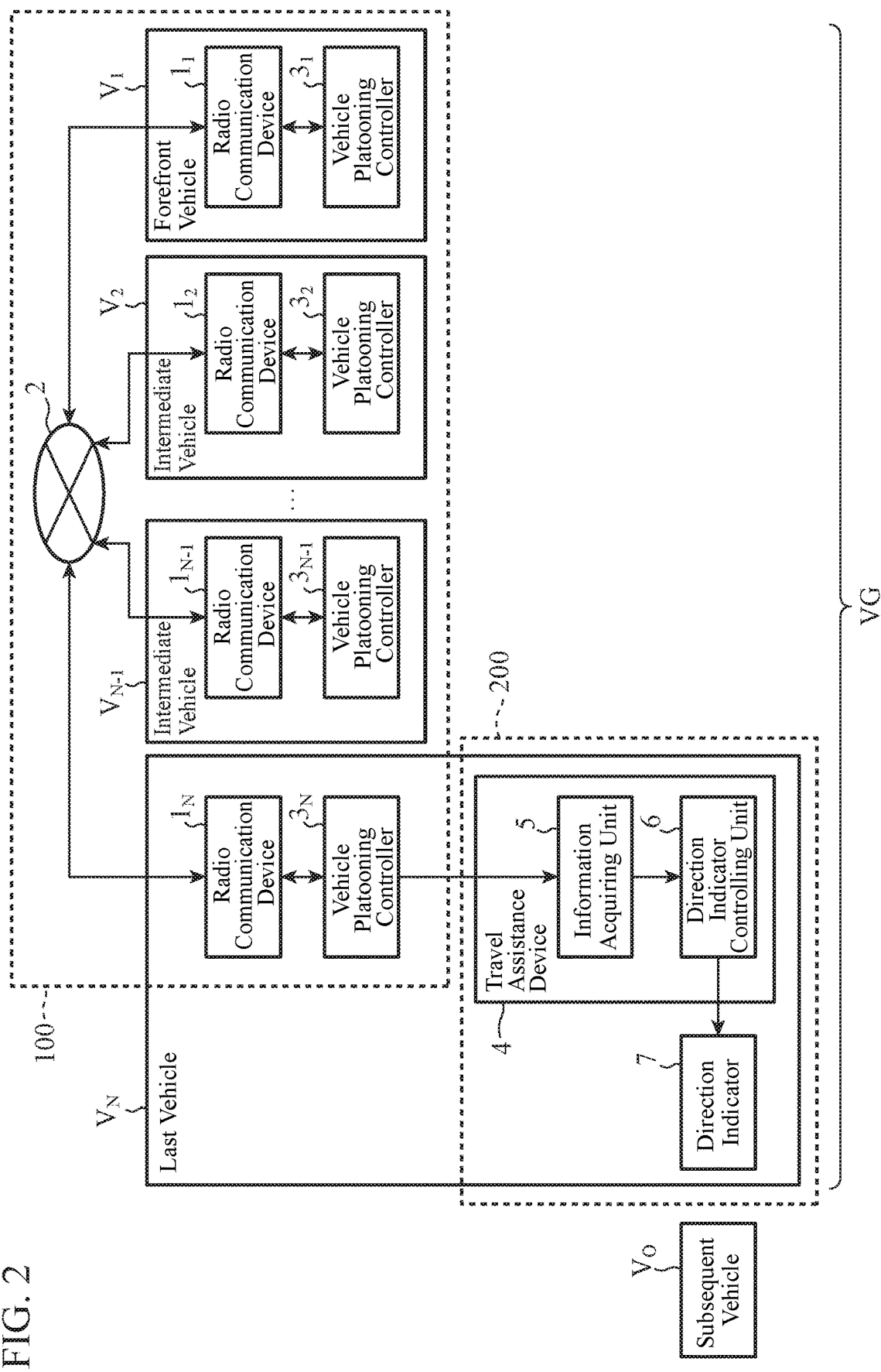
FIG. 2 is a block diagram illustrating main parts of a vehicle platooning controlling system and a travel assistance system according to a first embodiment of the present invention.
Figure 3A:
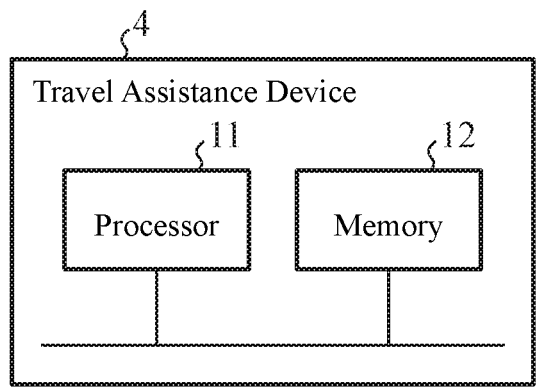
FIG. 3A is a block diagram illustrating a hardware configuration of the travel assistance device according to the first embodiment of the present invention.
Figure 3B:
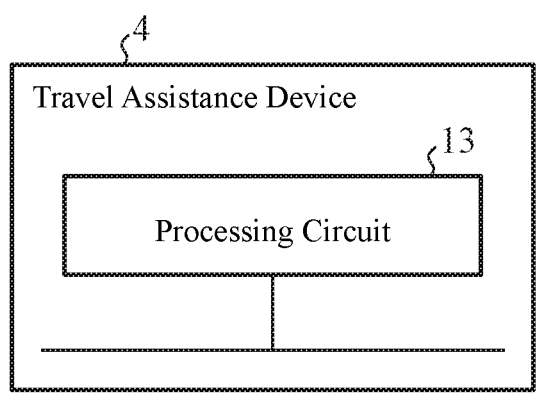
FIG. 3B is a block diagram illustrating another hardware configuration of the travel assistance device according to the first embodiment of the present invention.

FIG. 1 is an explanatory diagram illustrating positional relations of an intersection, a plurality of vehicles included in a vehicle group in the form of vehicle platooning, and a subsequent vehicle following the vehicle group in a state in which the vehicle group has approached the intersection that the vehicles are going to enter. FIG. 2 is a block diagram illustrating main parts of a vehicle platooning controlling system and a travel assistance system according to a first embodiment. FIG. 3A is a block diagram illustrating a hardware configuration of the travel assistance device according to the first embodiment. FIG. 3B is a block diagram illustrating another hardware configuration of the travel assistance device according to the first embodiment. A vehicle platooning controlling system 100 and a travel assistance system 200 according to the first embodiment will be described with reference to FIGS. 1 to 3.

As illustrated in FIG. 1, a vehicle group VG including a leading vehicle $V_1$, intermediate vehicles $V_2$ to $V_{N-1}$, and a last vehicle $V_N$ is in the form of vehicle platooning The number N of vehicles $V_1$ to $V_N$ included in the vehicle group VG may be any value not smaller than 2, and is a value not smaller than 4 in the example illustrated in FIG. 1. Each of the vehicles $V_1$ to $V_N$ is traveling by automatic operation, and will individually turn right, turn left, or go straight ahead at an intersection I.

When the vehicle group VG approaches the intersection I that the vehicles are going to enter, a subsequent vehicle $V_O$ following the vehicle group VG may be traveling behind the last vehicle $V_N$. The subsequent vehicle $V_O$ is a vehicle that is traveling by being driven by a human and subjected to travel assistance performed by the travel assistance system 200.

As illustrated in FIG. 2, the vehicles $V_1$ to $V_N$ include radio communication devices $1_1$ to $1_N$, respectively, and are capable of communicating with each other by so-called "V2X". Specifically, the communication between the radio communication devices $1_1$ to $1_N$ may be any of vehicle-to-vehicle communication, road-to-vehicle communication, and pedestrian-to-vehicle communication and may be performed via any network 2.

In addition, the vehicles $V_1$ to $V_N$ include vehicle platooning controllers $3_1$ to $3_N$, respectively. The vehicle platooning controllers $3_1$ to $3_N$ share information on the vehicles $V_1$ to $V_N$ through radio communication using the radio communication devices $1_1$ to $1_N$.

More specifically, the vehicle platooning controllers $3_1$ to $3_N$ share information representing departure places, places on the routes, destinations, and travel routes of the respective vehicles $V_1$ to $V_N$. The vehicle platooning controllers $3_1$ to $3_N$ also share information representing the positions, the speeds, and the like at which the respective vehicles $V_1$ to $V_N$ are traveling.

Hereinafter, the information shared by the vehicle platooning controllers $3_1$ to $3_N$ will be collectively referred to as "shared information". The vehicle platooning controllers $3_1$ to $3_N$ control vehicle platooning of the vehicle group VG by controlling automatic operation of the respective vehicles $V_1$ to $V_N$ on the basis of the shared information.

The radio communication devices $1_1$ to $1_N$ each include a receiver, a transmitter, an antenna, and the like for V2X, for example. The vehicle platooning controllers $3_1$ to $3_N$ each include an electronic control unit (ECU), an on-board information device, and the like, for example. The radio communication devices $1_1$ to $1_N$, the network 2, and the vehicle platooning controllers $3_1$ to $3_N$ constitute the main part of the vehicle platooning controlling system 100.

Note that the vehicle platooning controlling system 100 supports vehicle platooning in which different destinations are set for different vehicles $V_1$ to $V_N$, that is, vehicle platooning which the vehicles may freely leave at branching points on the travel routes. Thus, each of the vehicles $V_1$ to $V_N$ will individually turn right, turn left, or go straight ahead at the intersection I.

In addition, the last vehicle $V_N$ includes a travel assistance device 4. The vehicle platooning controller $3_N$ provided in the last vehicle $V_N$ has a function of outputting information described below to the travel assistance device 4 on the basis of the shared information.

Specifically, the shared information indicates the travel routes of the respective vehicles $V_1$ to $V_N$. The vehicle platooning controller $3_N$ generates information (hereinafter referred to as "straight-going vehicle information") indicating vehicles (hereinafter referred to as "straight-going vehicles") that will go straight ahead at the intersection I among the vehicles $V_1$ to $V_N$, and information (hereinafter referred to as "right/left turning vehicle information") indicating vehicles (hereinafter referred to as "right/left turning vehicles") that will turn right or left at the intersection I among the vehicles $V_1$ to $V_N$, on the basis of the travel routes of the respective vehicles $V_1$ to $V_N$. The vehicle platooning controller $3_N$ outputs the straight-going vehicle information and the right/left turning vehicle information to the travel assistance device 4.

The vehicle platooning controller $3_N$ also generates information indicating the right/left turning direction, at the intersection I, of the forefront right/left turning vehicle from among the right/left turning vehicles and information indicating the right/left turning directions, at the intersection I, of the respective right/left turning vehicles other than the forefront right/left turning vehicle (hereinafter collectively referred to as "first right/left turning direction information") on the basis of the travel routes of the respective vehicles $V_1$ to $V_N$. The vehicle platooning controller $3_N$ outputs the first right/left turning direction information to the travel assistance device 4.

The shared information also indicates the positions, the speeds, and the like at which the respective vehicles $V_1$ to $V_N$ are traveling. The vehicle platooning controller $3_N$ generates information (hereinafter referred to as "deceleration timing information") indicating the timing (hereinafter referred to as "deceleration timing") at which the forefront right/left turning vehicle from among the right/left turning vehicles will decelerate to turn right or left at the intersection I on the basis of the positions, the speeds and the like at which the respective vehicles $V_1$ to $V_N$ are traveling. The vehicle platooning controller $3_N$ outputs the deceleration timing information to the travel assistance device 4.

The vehicle platooning controller $3_N$ also generates information (hereinafter referred to as "lighting-up timing information") indicating the timing (hereinafter referred to as "lighting-up timing") at which the respective right/left turning vehicles except the forefront right/left turning vehicle should light up the direction indicators of the vehicles for turning right or left at the intersection I (specifically, the timing at which the distance between each of the corresponding vehicles and the intersection I becomes a value equal to or smaller than 30 meters, for example) on the basis of the positions, the speeds, and the like at which the respective vehicles $V_1$ to $V_N$ are traveling. The vehicle platooning controller $3_N$ outputs the lighting-up timing information to the travel assistance device 4.

The vehicle platooning controller $3_N$ also generates information (hereinafter referred to as "right/left turning timing information") indicating the timing (hereinafter referred to as "right/left turning timing") at which the rearmost right/left turning vehicle from among the right/left turning vehicles will turn right or left at the intersection I on the basis of the positions, the speeds, and the like of the respective vehicles $V_1$ to $V_N$. The vehicle platooning controller $3_N$ outputs the right/left turning timing information to the travel assistance device 4.

Hereinafter, the information that the vehicle platooning controller $3_N$ outputs to the travel assistance device 4 will be collectively referred to as "first control information".

An information acquiring unit 5 acquires the first control information output by the vehicle platooning controller $3_N$. A direction indicator controlling unit 6 performs control to turn on or off a direction indicator 7 of the last vehicle $V_N$ as follows by using the first control information acquired by the information acquiring unit 5.

First, when the forefront right/left turning vehicle from among the right/left turning vehicles approaches the intersection I, the direction indicator controlling unit 6 performs control to turn on the direction indicator 7 of the last vehicle $V_N$ depending on the right/left turning direction of the forefront right/left turning vehicle at the deceleration timing of the forefront right/left turning vehicle. For this control, the right/left turning vehicle information, the first right/left turning direction information, and the deceleration timing information in the first control information are used.

Subsequently, when each of the right/left turning vehicles except the forefront right/left turning vehicle approaches the intersection I, the direction indicator controlling unit 6 performs control to turn on the direction indicator 7 of the last vehicle $V_N$ depending on the right/left turning direction of the corresponding vehicle at the lighting-up timing of the direction indicator of the corresponding vehicle. For this control, the right/left turning vehicle information, the first right/left turning direction information, and the lighting-up timing information in the first control information are used.

Subsequently, in a case where the last vehicle $V_N$ is a straight-going vehicle, the direction indicator controlling unit 6 performs control to turn off the direction indicator 7 of the last vehicle $V_N$ at the right/left turning timing of the rearmost right/left turning vehicle among the right/left turning vehicles. For this control, the straight-going vehicle information, the right/left turning vehicle information, and the right/left turning timing information in the first control information are used.

Hereinafter, the control performed by the direction indicator controlling unit 6 will be collectively referred to as "first control".

Assume, for example, that the vehicle group VG includes eight vehicles $V_1$ to $V_8$, among which the leading vehicle $V_1$ will go straight ahead at the intersection I, the intermediate vehicle $V_2$ will turn right at the intersection I, the intermediate vehicle $V_3$ will go straight ahead at the intersection I, the intermediate vehicle $V_4$ will turn left at the intersection I, the intermediate vehicle $V_5$ will turn right at the intersection I, the intermediate vehicle $V_6$ will turn left at the intersection I, and the intermediate vehicle $V_7$ and the last vehicle $V_8$ will go straight ahead at the intersection I.

In this case, the direction indicator controlling unit 6 first turns on the direction indicator 7 of the last vehicle $V_8$ in the right turning direction depending on the right/left turning direction of the intermediate vehicle $V_2$ at the deceleration timing of the intermediate vehicle $V_2$.

Subsequently, the direction indicator controlling unit 6 turns on the direction indicator 7 of the last vehicle $V_8$ in the left turning direction depending on the right/left turning direction of the intermediate vehicle $V_4$ at the lighting-up timing of the direction indicator of the intermediate vehicle $V_4$. In other words, the direction indicator controlling unit 6 switches the direction indicator 7 from the lighted state in the right turning direction to the lighted state in the left turning direction.

Subsequently, the direction indicator controlling unit 6 turns on the direction indicator 7 of the last vehicle $V_8$ in the right turning direction depending on the right/left turning direction of the intermediate vehicle $V_5$ at the lighting-up timing of the direction indicator of the intermediate vehicle $V_5$. In other words, the direction indicator controlling unit 6 switches the direction indicator 7 from the lighted state in the left turning direction to the lighted state in the right turning direction.

Subsequently, the direction indicator controlling unit 6 turns on the direction indicator 7 of the last vehicle $V_8$ in the left turning direction depending on the right/left turning direction of the intermediate vehicle $V_6$ at the lighting-up timing of the direction indicator of the intermediate vehicle $V_6$. In other words, the direction indicator controlling unit 6 switches the direction indicator 7 from the lighted state in the right turning direction to the lighted state in the left turning direction.

Thereafter, the direction indicator controlling unit 6 turns off the direction indicator 7 of the last vehicle $V_8$ at the timing when the intermediate vehicle $V_6$ turns left at the intersection I.

The information acquiring unit 5 and the direction indicator controlling unit 6 constitute the main part of the travel assistance device 4. The travel assistance device 4 and the direction indicator 7 constitute the main part of the travel assistance system 200.

FIG. 3 illustrates hardware configurations of the main part of the travel assistance device 4. As illustrated in FIG. 3A, the travel assistance device 4 is constituted by a computer, and includes a processor 11 and a memory 12. The memory 12 stores programs for causing the computer to function as the information acquiring unit 5 and the direction indicator controlling unit 6 illustrated in FIG. 2. The functions of the information acquiring unit 5 and the direction indicator controlling unit 6 are implemented by the processor 11 by reading and executing the programs stored in the memory 12.

The processor 11 is constituted by a central processing unit (CPU), a graphics processing unit (GPU), a microprocessor, a microcontroller or a digital signal processor (DSP), for example. The memory 12 is constituted by a semiconductor memory such as a random access memory (RAM), a read-only memory (ROM), a flash memory, an erasable programmable read-only memory (EPROM) or an electrically erasable programmable read-only memory), a magnetic disk, an optical disc, or a magneto-optical disc, for example.

Alternatively, as illustrated in FIG. 3B, the functions of the information acquiring unit 5 and the direction indicator controlling unit 6 may be implemented by a dedicated processing circuit 13. The processing circuit 13 is an application specific integrated circuit (ASIC), a programmable logic device (PLD), a field-programmable gate array (FPGA), a system-on-a-chip (SoC), a system large-scale integration (LSI), or a combination thereof, for example.

Note that the individual functions of the information acquiring unit 5 and the direction indicator controlling unit 6 may be respectively implemented by the processing circuits 13 or the functions of the information acquiring unit 5 and the direction indicator controlling unit 6 may be collectively implemented by the processing circuit 13. Alternatively, some of the functions of the information acquiring unit 5 and the direction indicator controlling unit 6 may be implemented by the processor 11 and the memory 12 illustrated in FIG. 3A, and others may be implemented by the processing circuit 13 illustrated in FIG. 3B.

Figure 4:
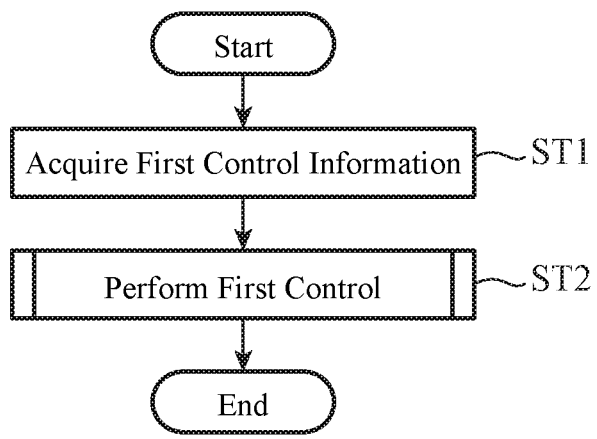
FIG. 4 is a flowchart illustrating operation of the travel assistance device according to the first embodiment of the present invention.

Next, operation of the travel assistance device 4 will be explained with reference to a flowchart in FIG. 4.

First, in step ST1, the information acquiring unit 5 acquires the first control information output by the vehicle platooning controller $3_N$. The information acquiring unit 5 outputs the acquired first control information to the direction indicator controlling unit 6.

Subsequently, in step ST2, the direction indicator controlling unit 6 performs the first control by using the first control information input from the information acquiring unit 5 in step ST1.

Figure 5:
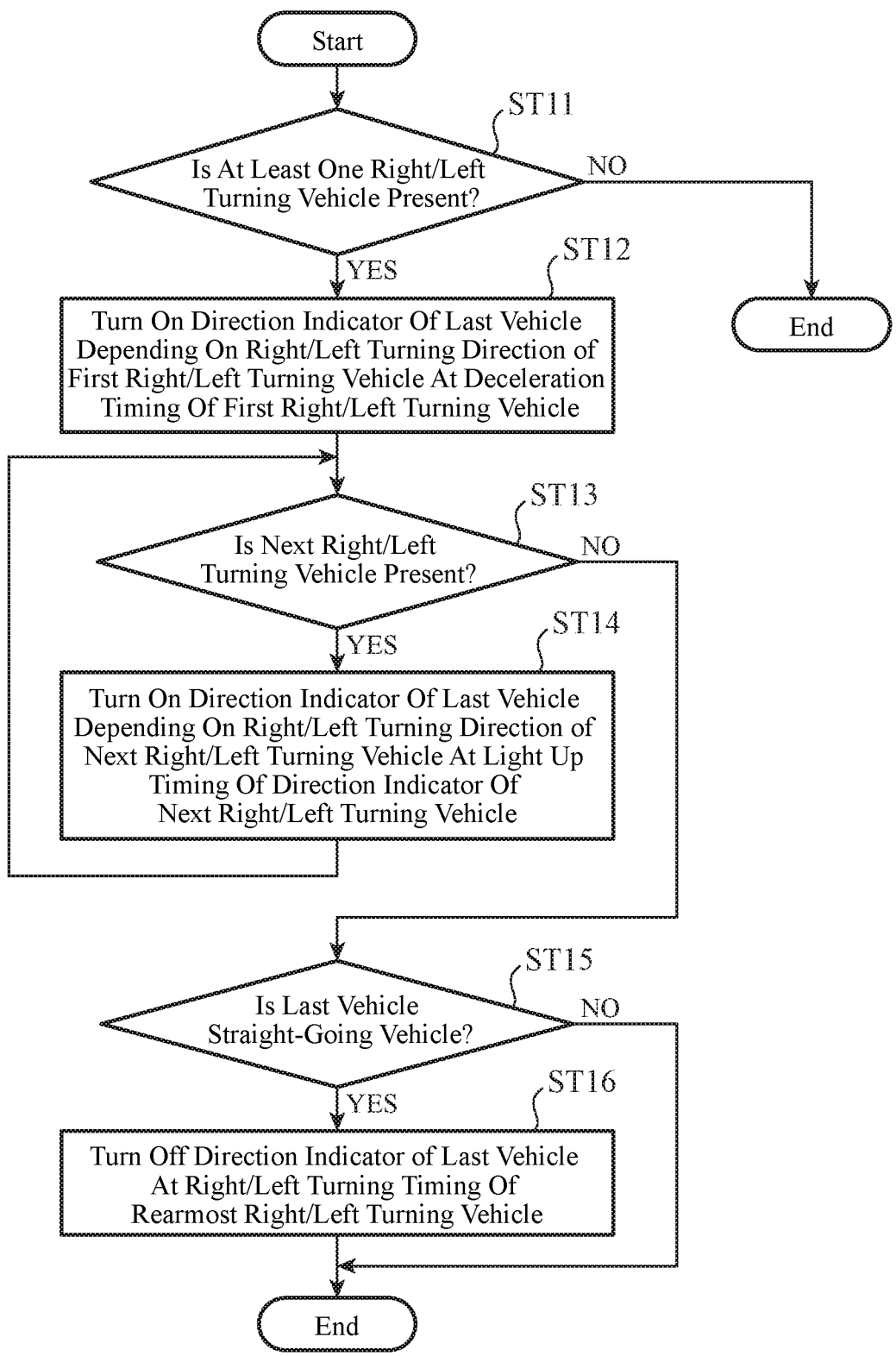
FIG. 5 is a flowchart illustrating detailed processes of first control performed by the travel assistance device according to the first embodiment of the present invention.

Next, detailed processes of the first control in step ST2 will be explained with reference to a flowchart in FIG. 5. In the explanation of the first control below, the forefront vehicle from among the right/left turning vehicles will be referred to as a "first right/left turning vehicle", each of the right/left turning vehicles except the forefront right/left turning vehicle will be referred to as a "next right/left turning vehicle", and the rearmost vehicle from among the right/left turning vehicles will be referred to as a "rearmost right/left turning vehicle".

First, in step ST11, the direction indicator controlling unit 6 determines whether or not at least one right/left turning vehicle is present, that is, whether or not at least one of the vehicles $V_1$ to $V_N$ will turn right or left at the intersection I by referring to the right/left turning vehicle information.

If no right/left turning vehicle is present, that is, if all of the vehicles $V_1$ to $V_N$ will go straight ahead at the intersection I (step ST11 "NO"), the processing of the direction indicator controlling unit 6 is terminated.

In contrast, if at least one right/left turning vehicle is present, that is, at least one of the vehicles $V_1$ to $V_N$ will turn right or left at the intersection I (step ST11 "YES"), the direction indicator controlling unit 6 refers to the deceleration timing information and waits for the deceleration timing of the first right/left turning vehicle. The direction indicator controlling unit 6 turns on the direction indicator 7 of the last vehicle $V_N$ depending on the right/left turning direction of the first right/left turning vehicle at the deceleration timing of the first right/left turning vehicle by referring to the first right/left turning direction information (step ST12).

Subsequently, in step ST13, the direction indicator controlling unit 6 determines whether or not a next right/left turning vehicle is present by referring to the right/left turning vehicle information.

If a next right/left turning vehicle is present (step ST13 "YES"), the direction indicator controlling unit 6 refers to the lighting-up timing information and waits for the lighting-up timing of the direction indicator of the next right/left turning vehicle. The direction indicator controlling unit 6 turns on the direction indicator 7 of the last vehicle $V_N$ depending on the right/left turning direction of the next right/left turning vehicle at the lighting-up timing of the direction indicator of the next right/left turning vehicle by referring to the first right/left turning direction information (step ST14). Subsequently, the processing of the direction indicator controlling unit 6 returns to step ST13, in which the direction indicator controlling unit 6 further determines whether or not a next right/left turning vehicle after the next right/left turning vehicle is present.

If no next right/left turning vehicle is present (step ST13 "NO"), the direction indicator controlling unit 6 determines whether the last vehicle $V_N$ is a straight-going vehicle or a right/left turning vehicle by referring to the straight-going vehicle information and the right/left turning vehicle information in step ST15.

If the last vehicle $V_N$ is a straight-going vehicle (step ST15 "YES"), the direction indicator controlling unit 6 refers to the right/left turning timing information and waits for the right/left turning timing of the rearmost right/left turning vehicle. The direction indicator controlling unit 6 turns off the direction indicator 7 of the last vehicle $V_N$ at the right/left turning timing of the rearmost right/left turning vehicle (step ST16).

If the last vehicle $V_N$ is a right/left turning vehicle, the last vehicle $V_N$ is definitely the rearmost right/left turning vehicle, and the direction indicator 7 is thus turned on depending on the right/left tuning direction of the last vehicle $V_N$ in the final process of step ST14. Thereafter, when the last vehicle $V_N$ has turned right or left, the direction indicator 7 is turned off with returning of the steering wheel. Thus, the control for turning off the direction indicator by the direction indicator controlling unit 6 is unnecessary, and the process of step ST16 is skipped (step ST15 "NO").

The first control can let the driver of the subsequent vehicle $V_O$ know that at least one of the vehicles $V_1$ to $V_N$, that is, at least one right/left turning vehicle will turn right or left at the intersection I. In addition, the first control enables the driver of the subsequent vehicle $V_O$ to predict that the last vehicle $V_N$ will decelerate because of a right/left turning vehicle turning right or left at the deceleration timing of the foremost vehicle from among the right/left turning vehicles. Furthermore, these effects are produced even when the leading vehicle $V_1$ goes straight ahead at the intersection I.

Note that the first control information is not limited to the straight-going vehicle information, the right/left turning vehicle information, the first right/left turning direction information, the deceleration timing information, the lighting-up timing information, and the right/left turning timing information. The first control information may include some of the information above, or include other information different from the information above. Thus, the first control information may indicate anything that enables the travel assistance device 4 to perform control corresponding to the first control.

In addition, the vehicle platooning controlling system 100 is not limited to the system configuration illustrated in FIG. 2, and may have any system configuration. For example, the radio communication devices $1_1$ to $1_N$ may be capable of communicating with a server device via the network 2, and the vehicle platooning controllers $3_1$ to $3_N$ and the server device may cooperate with each other to control the vehicle platooning of the vehicle group VG. Alternatively, a personal digital assistant such as a smartphone or a portable navigation device (PND) may be brought into at least one of the vehicles $V_1$ to $V_N$, and the vehicle platooning controllers $3_1$ to $3_N$ and the personal digital assistant may cooperate with each other to control the vehicle platooning of the vehicle group VG. Alternatively, the vehicle platooning controllers $3_1$ to $3_N$, the server device, and the personal digital assistant may cooperate with each other to control the vehicle platooning of the vehicle group VG.

Furthermore, the vehicle platooning controlling system 100 may support vehicle platooning which the vehicles may freely leave at branching points on the travel routes and which vehicles may freely join at the branching points. Note that leaving or joining of a vehicle can lead to a case where the vehicle V1 changes from the leading vehicle to an intermediate vehicle or the last vehicle in the vehicle group VG, a case where one of the vehicles V2 to VN−1 changes from an intermediate vehicle to the leading vehicle or the last vehicle in the vehicle group VG, or a case where the vehicle VN changes from the last vehicle to the leading vehicle or an intermediate vehicle in the vehicle group VG. Thus, the travel assistance system 200 for the subsequent vehicle VO is preferably provided in each of all the vehicles that can be included in the vehicle group VG. In FIG. 2, the travel assistance systems 200 provided in the individual vehicles V1 to VN−1 except the vehicle VN are not illustrated.

In addition, vehicle platooning controlled by the vehicle platooning controlling system 100 may be provided in any manner in which the intermediate vehicles $V_2$ to $V_{N-1}$ and the last vehicle $V_N$ travel by automatic operation. Thus, the leading vehicle $V_1$ may travel by being driven by a human.

As described above, the travel assistance device 4 of the first embodiment is a travel assistance device 4 that assists traveling of a subsequent vehicle $V_O$ following a vehicle group VG in the form of vehicle platooning by the last vehicle $V_N$ among a plurality of vehicles $V_1$ to $V_N$ included in the vehicle group VG, and includes an information acquiring unit 5 that acquires information indicating right/left turning vehicles that will turn right or left at an intersection I among the vehicles $V_1$ to $V_N$ and information indicating the deceleration timing of the foremost right/left turning vehicle from among the right/left turning vehicles, and a direction indicator controlling unit 6 that turns on the direction indicator 7 of the last vehicle $V_N$ at the deceleration timing of the foremost right/left turning vehicle. This can let the driver of the subsequent vehicle $V_O$ know that at least one of the vehicles $V_1$ to $V_N$, that is, at least one right/left turning vehicle will turn right or left at the intersection I. In addition, it is possible to let the driver of the subsequent vehicle $V_O$ predict that last vehicle $V_N$ will decelerate because of a right/left turning vehicle turning right or left at the deceleration timing of the foremost vehicle from among the right/left turning vehicles. Furthermore, these effects are produced even when the leading vehicle $V_1$ goes straight ahead at the intersection I.

In addition, the information acquiring unit 5 acquires information indicating the right/left turning direction of the foremost right/left turning vehicle from among the right/left turning vehicles, and the direction indicator controlling unit 6 turns on the direction indicator 7 of the last vehicle $V_N$ depending on the right/left turning direction of the foremost right/left turning vehicle at the deceleration timing of the foremost right/left turning vehicle. The process in step ST12 can let the driver of the subsequent vehicle $V_O$ know the right/left turning direction of the foremost right/left turning vehicle.

In addition, the information acquiring unit 5 acquires information indicating lighting-up timing of the direction indicator of each of the right/left turning vehicles except the foremost right/left turning vehicle and information indicating the right/left turning direction of each of the right/left turning vehicles except the foremost right/left turning vehicle, and the direction indicator controlling unit 6 turns on the direction indicator 7 of the last vehicle $V_N$ depending on the right/left turning direction of each of the right/left turning vehicles except the foremost right/left turning vehicle at the lighting-up timing of the direction indicator of each of the right/let turning vehicles except the foremost right/left turning vehicle. The process in step ST14 can let the driver of the subsequent vehicle $V_O$ know the right/left turning direction of each of the right/left turning vehicles except the foremost right/left turning vehicle.

In addition, the information acquiring unit 5 acquires information indicating straight-going vehicles that will go straight ahead at the intersection I among a plurality of vehicles $V_1$ to $V_N$ and information indicating the right/left turning timing of the rearmost right/left turning vehicle among the right/left turning vehicles, and when the last vehicle $V_N$ is a straight-going vehicle, the direction indicator controlling unit 6 turns off the direction indicator 7 of the last vehicle $V_N$ at the right/left turning timing of the rearmost right/left turning vehicle among the right/left turning vehicles. The process in step ST16 enables the lighted direction indicator 7 to be turned off at appropriate timing when the last vehicle $V_N$ will go straight ahead at the intersection I.

Second Embodiment

Figure 6:
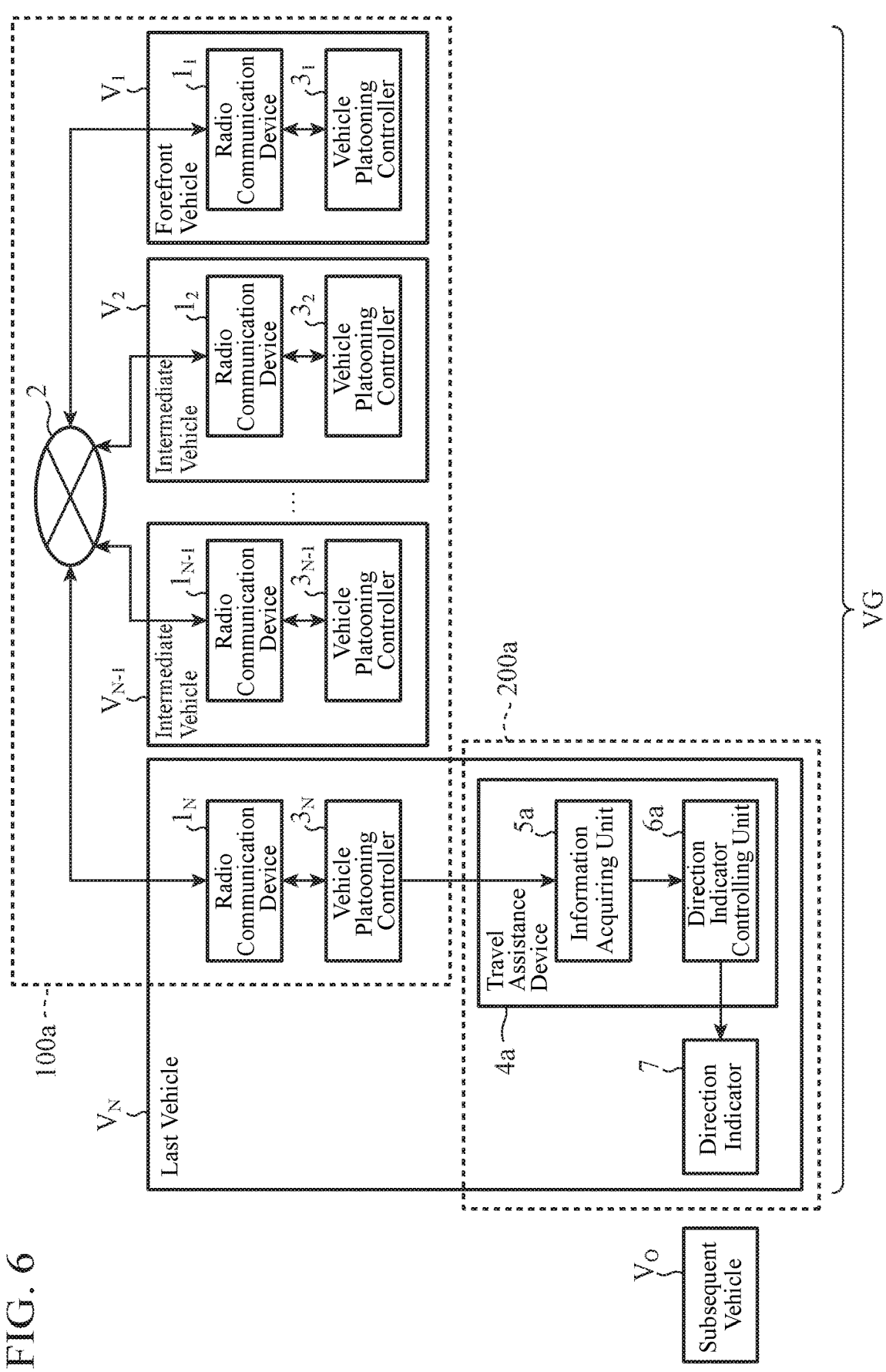
FIG. 6 is a block diagram illustrating main parts of a vehicle platooning controlling system and a travel assistance system according to a second embodiment of the present invention.

FIG. 6 is a block diagram illustrating main parts of a vehicle platooning controlling system and a travel assistance system according to a second embodiment. A vehicle platooning controlling system 100a and a travel assistance system 200a according to the second embodiment will be described with reference to FIG. 6.

Note that, in FIG. 6, blocks that are similar to those illustrated in FIG. 2 are designated by the same reference numerals, and the description thereof will not be repeated. The hardware configurations of a travel assistance device 4a are similar to those explained with reference to FIG. 3 in the first embodiment, and the illustration and the description thereof will not be repeated. The positional relations of the intersection I, the vehicles $V_1$ to $V_N$ included in the vehicle group VG, and the subsequent vehicle $V_O$ following the vehicle group VG are similar to those illustrated in FIG. 1, and will thus be explained with reference to FIG. 1.

Vehicle platooning controllers $3_1$ to $3_N$ of the vehicle platooning controlling system 100a share information on the vehicles $V_1$ to $V_N$ in a manner similar to the vehicle platooning controllers $3_1$ to $3_N$ of the vehicle platooning controlling system 100 of the first embodiment. The vehicle platooning controller $3_N$ provided in the last vehicle $V_N$ has a function of outputting information described below to the travel assistance device 4a on the basis of the shared information.

Specifically, the shared information indicates the travel routes of the respective vehicles $V_1$ to $V_N$. The vehicle platooning controller $3_N$ generates information indicating straight-going vehicle that will go straight ahead at the intersection I among the vehicles $V_1$ to $V_N$, that is, straight-going vehicle information, and information indicating right/left turning vehicles that will turn right or left at the intersection I among the vehicles $V_1$ to $V_N$, that is, right/left turning vehicle information on the basis of the travel routes of the respective vehicles $V_1$ to $V_N$. The vehicle platooning controller $3_N$ outputs the straight-going vehicle information and the right/left turning vehicle information to the travel assistance device 4a.

The vehicle platooning controller $3_N$ also generates information (hereinafter referred to as "second right/left turning direction information") indicating the right/left turning direction, at the intersection I, of the rearmost right/left turning vehicle among the right/left turning vehicles on the basis of the travel routes of the respective vehicles $V_1$ to $V_N$. The vehicle platooning controller $3_N$ outputs the second right/left turning direction information to the travel assistance device 4a.

The shared information also indicates the positions, the speeds, and the like at which the respective vehicles $V_1$ to $V_N$ are traveling. The vehicle platooning controller $3_N$ generates information indicating deceleration timing of the foremost right/left turning vehicle from among the right/left turning vehicles, that is, deceleration timing information on the basis of the positions, the speeds, and the like at which the respective vehicles $V_1$ to $V_N$ are traveling. The vehicle platooning controller $3_N$ outputs the deceleration timing information to the travel assistance device 4a.

The vehicle platooning controller $3_N$ also generates information indicating right/left turning timing of the rearmost right/left turning vehicle among the right/left turning vehicles, that is, right/left turning timing information on the basis of the positions, the speeds, and the like at which the respective vehicles $V_1$ to $V_N$ are traveling. The vehicle platooning controller $3_N$ outputs the right/left turning timing information to the travel assistance device 4a.

Hereinafter, the information that the vehicle platooning controller $3_N$ outputs to the travel assistance device 4a will be collectively referred to as "second control information".

An information acquiring unit 5a acquires the second control information output by the vehicle platooning controller $3_N$. A direction indicator controlling unit 6a performs control to turn a direction indicator 7 of the last vehicle $V_N$ on or off as follows by using the second control information acquired by the information acquiring unit 5a.

First, when the foremost right/left turning vehicle from among the right/left turning vehicles approaches the intersection I, the direction indicator controlling unit 6a performs control to turn on the direction indicator 7 of the last vehicle $V_N$ depending on the right/left turning direction of the rearmost right/left turning vehicle among the right/left turning vehicles at the deceleration timing of the foremost right/left turning vehicle. For this control, the right/left turning vehicle information, the second right/left turning direction information, and the deceleration timing information in the second control information are used.

Subsequently, in a case where the last vehicle $V_N$ is a straight-going vehicle, the direction indicator controlling unit 6a performs control to turn off the direction indicator 7 of the last vehicle $V_N$ at the right/left turning timing of the rearmost right/left turning vehicle among the right/left turning vehicles. For this control, the straight-going vehicle information, the right/left turning vehicle information, and the right/left turning timing information in the second control information are used.

Hereinafter, the control performed by the direction indicator controlling unit 6a will be collectively referred to as "second control".

Assume, for example, that the vehicle group VG includes eight vehicles $V_1$ to $V_8$, among which the leading vehicle $V_1$ will go straight ahead at the intersection I, the intermediate vehicle $V_2$ will turn right at the intersection I, the intermediate vehicle $V_3$ will go straight ahead at the intersection I, the intermediate vehicle $V_4$ will turn left at the intersection I, the intermediate vehicle $V_5$ will turn right at the intersection I, the intermediate vehicle $V_6$ will turn left at the intersection I, and the intermediate vehicle $V_7$ and the last vehicle $V_8$ will go straight ahead at the intersection I.

In this case, the direction indicator controlling unit 6a turns on the direction indicator 7 of the last vehicle $V_8$ in the left turning direction depending on the right/left turning direction of the intermediate vehicle $V_6$ at the deceleration timing of the intermediate vehicle $V_2$. Thereafter, the direction indicator controlling unit 6a turns off the direction indicator 7 of the last vehicle $V_8$ at the timing when the intermediate vehicle $V_6$ turns left at the intersection I.

The information acquiring unit 5a and the direction indicator controlling unit 6a constitute the main part of the travel assistance device 4a. The travel assistance device 4a and the direction indicator 7 constitute the main part of the travel assistance system 200a.

Figure 7:
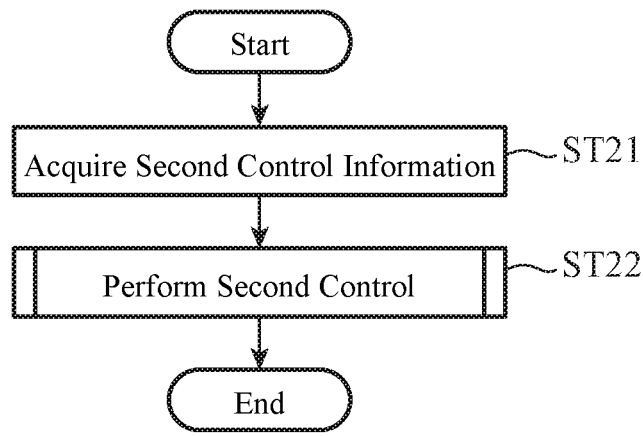
FIG. 7 is a flowchart illustrating operation of the travel assistance device according to the second embodiment of the present invention.

Next, operation of the travel assistance device 4a will be explained with reference to a flowchart in FIG. 7.

First, in step ST21, the information acquiring unit 5a acquires the second control information output by the vehicle platooning controller $3_N$. The information acquiring unit 5a outputs the acquired second control information to the direction indicator controlling unit 6a.

Subsequently, in step ST22, the direction indicator controlling unit 6a performs the second control by using the second control information input from the information acquiring unit 5a in step ST21.

Figure 8:
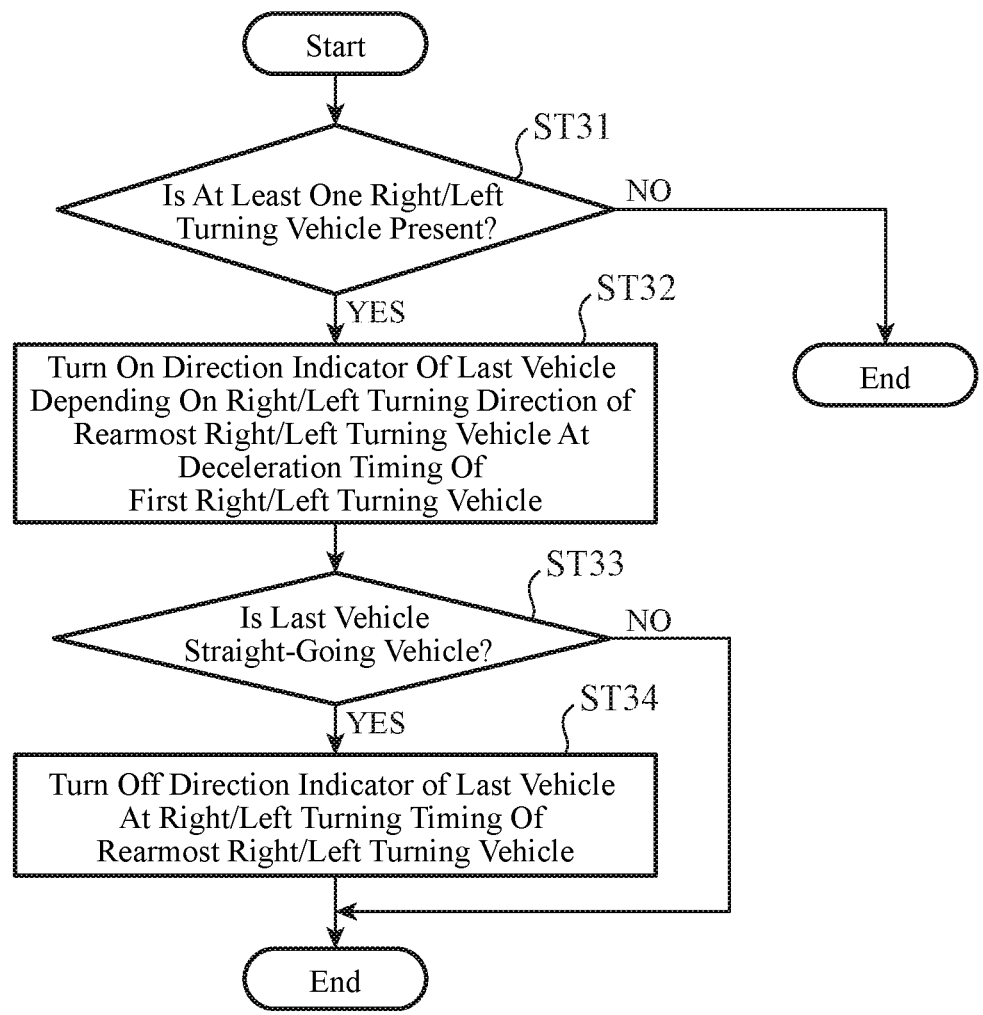
FIG. 8 is a flowchart illustrating detailed processes of second control performed by the travel assistance device according to the second embodiment of the present invention.

Next, detailed processes of the second control in step ST22 will be explained with reference to a flowchart in FIG. 8. In the explanation of the second control below, the foremost vehicle from among the right/left turning vehicles will be referred to as a "first right/left turning vehicle", and the rearmost vehicle among the right/left turning vehicles will be referred to as a "rearmost right/left turning vehicle".

First, in step ST31, the direction indicator controlling unit 6a determines whether or not at least one right/left turning vehicle is present, that is whether or not at least one of the vehicles $V_1$ to $V_N$ will turn right or left at the intersection I by referring to the right/left turning vehicle information.

If no right/left turning vehicle is present, that is, if all of the vehicles $V_1$ to $V_N$ will go straight ahead at the intersection I (step ST31 "NO"), the processing of the direction indicator controlling unit 6a is terminated.

In contrast, if at least one right/left turning vehicle is present, that is, at least one of the vehicles $V_1$ to $V_N$ will turn right or left at the intersection I (step ST31 "YES"), the direction indicator controlling unit 6a refers to the deceleration timing information and waits for the deceleration timing of the first right/left turning vehicle. The direction indicator controlling unit 6a turns on the direction indicator 7 of the last vehicle $V_N$ depending on the right/left turning direction of the rearmost right/left turning vehicle at the deceleration timing of the first right/left turning vehicle by referring to the second right/left turning direction information (step ST32).

Subsequently, in step ST33, the direction indicator controlling unit 6a determines whether the last vehicle $V_N$ is a straight-going vehicle or a right/left turning vehicle by referring to the straight-going vehicle information and the right/left turning vehicle information.

If the last vehicle $V_N$ is a straight-going vehicle (step ST33 "YES"), the direction indicator controlling unit 6a refers to the right/left turning timing information and waits for the right/left turning timing of the rearmost right/left turning vehicle. The direction indicator controlling unit 6a turns off the direction indicator 7 of the last vehicle $V_N$ at the right/left turning timing of the rearmost right/left turning vehicle (step ST34).

If the last vehicle $V_N$ is a right/left turning vehicle, the last vehicle $V_N$ is definitely the rearmost right/left turning vehicle, and the direction indicator 7 is thus turned on depending on the right/left tuning direction of the last vehicle $V_N$ in the process of step ST32. Thereafter, when the last vehicle $V_N$ has turned right or left, the direction indicator 7 is turned off with returning of the steering wheel. Thus, the control for turning off the direction indicator by the direction indicator controlling unit 6a is unnecessary, and the process of step ST34 is skipped (step ST33 "NO").

The second control can let the driver of the subsequent vehicle $V_O$ know that at least one of the vehicles $V_1$ to $V_N$, that is, at least one right/left turning vehicle will turn right or left at the intersection I. In addition, it is possible to let the driver of the subsequent vehicle $V_O$ predict that last vehicle $V_N$ will decelerate because of a right/left turning vehicle turning right or left at the deceleration timing of the foremost vehicle from among the right/left turning vehicles. Furthermore, these effects are produced even when the leading vehicle $V_1$ goes straight ahead at the intersection I.

Note that the second control information is not limited to the straight-going vehicle information, the right/left turning vehicle information, the second right/left turning direction information, the deceleration timing information, and the right/left turning timing information. The second control information may include some of the information above, or include other information different from the information above. Thus, the second control information may indicate anything that enables the travel assistance device 4a to perform control corresponding to the second control.

In addition, the vehicle platooning controlling system 100a can employ various modifications similar to those of the vehicle platooning controlling system 100 according to the first embodiment.

As described above, the travel assistance device 4a of the second embodiment is a travel assistance device 4a that assists traveling of a subsequent vehicle $V_O$ following a vehicle group VG in the form of vehicle platooning by the last vehicle $V_N$ among a plurality of vehicles $V_1$ to $V_N$ included in the vehicle group VG, and includes an information acquiring unit 5a that acquires information indicating right/left turning vehicles that will turn right or left at an intersection I among the vehicles $V_1$ to $V_N$ and information indicating the deceleration timing of the foremost right/left turning vehicle from among the right/left turning vehicles, and a direction indicator controlling unit 6a that turns on the direction indicator 7 of the last vehicle $V_N$ at the deceleration timing of the foremost right/left turning vehicle. This can let the driver of the subsequent vehicle $V_O$ know that at least one of the vehicles $V_1$ to $V_N$, that is, at least one right/left turning vehicle will turn right or left at the intersection I. In addition, this enables the driver of the subsequent vehicle $V_O$ to predict that last vehicle $V_N$ will decelerate because of a right/left turning vehicle turning right or left at the deceleration timing of the foremost vehicle from among the right/left turning vehicles. Furthermore, these effects are produced even when the leading vehicle $V_1$ goes straight ahead at the intersection I.

In addition, the information acquiring unit 5a acquires information indicating the right/left turning direction of the rearmost right/left turning vehicle among the right/left turning vehicles, and the direction indicator controlling unit 6a turns on the direction indicator 7 of the last vehicle $V_N$ depending on the right/left turning direction of the rearmost right/left turning vehicle at the deceleration timing of the foremost right/left turning vehicle. The process in step ST32 can let the driver of the subsequent vehicle $V_O$ know the right/left turning direction of the rearmost right/left turning vehicle among the right/left turning vehicles.

In addition, the information acquiring unit 5a acquires information indicating straight-going vehicles that will go straight ahead at the intersection I among a plurality of vehicles $V_1$ to $V_N$ and information indicating the right/left turning timing of the rearmost right/left turning vehicle among the right/left turning vehicles, and when the last vehicle $V_N$ is a straight-going vehicle, the direction indicator controlling unit 6a turns off the direction indicator 7 of the last vehicle $V_N$ at the right/left turning timing of the rearmost right/left turning vehicle among the right/left turning vehicles. The process in step ST34 enables the lighted direction indicator 7 to be turned off at appropriate timing when the last vehicle $V_N$ will go straight ahead at the intersection I.

Third Embodiment

Figure 9:
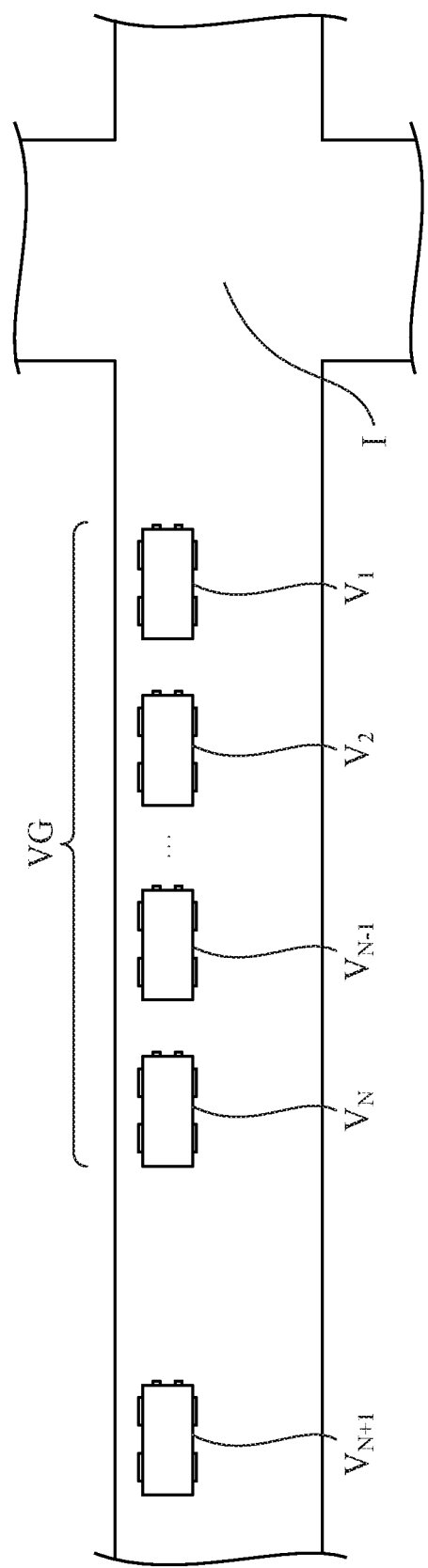
FIG. 9 is an explanatory diagram illustrating positional relations of an intersection, a plurality of vehicles included in a vehicle group in the form of vehicle platooning, and a vehicle that is to join the vehicle group in a state in which the vehicle group has approached the intersection that the vehicles are going to enter.
Figure 10:
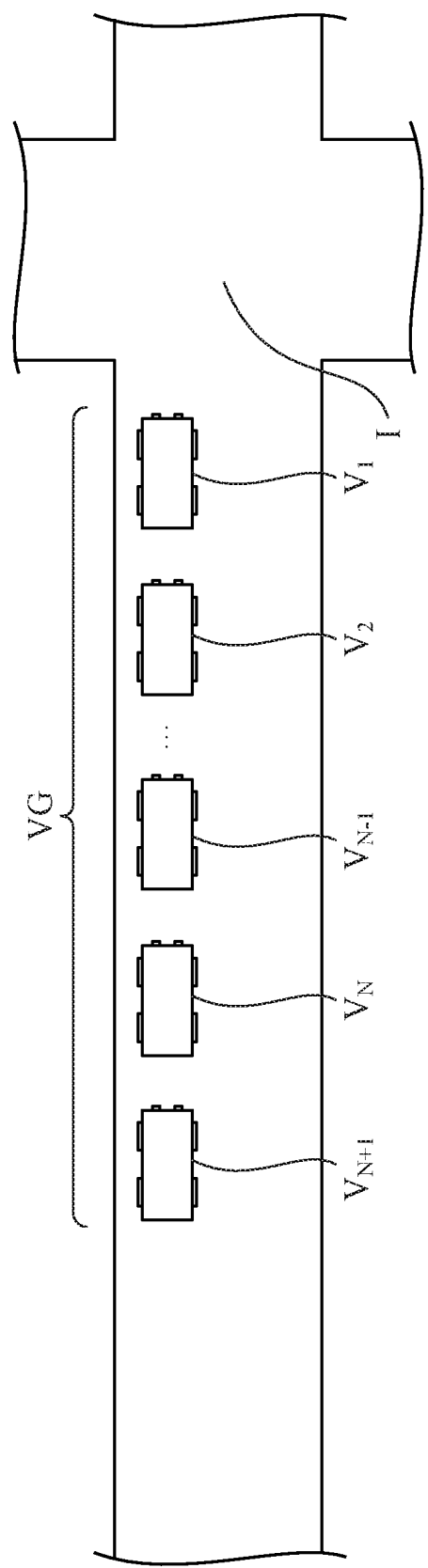
FIG. 10 is an explanation diagram illustrating positional relations of an intersection and a plurality of vehicles included in a vehicle group in the form of vehicle platooning in a case where a new vehicle is assumed to join the vehicle group immediately before the vehicle group enters the intersection.
Figure 11:
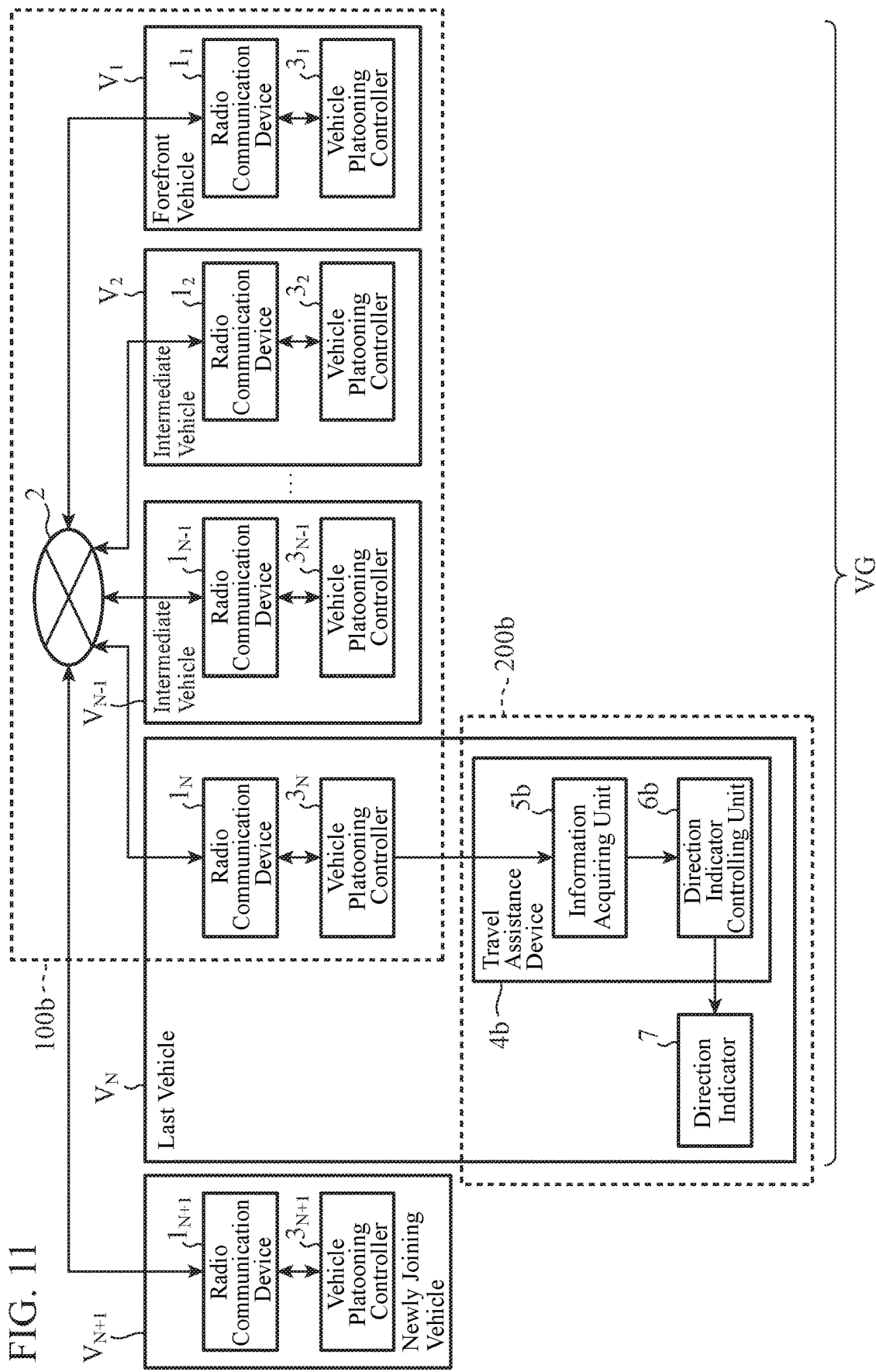
FIG. 11 is a block diagram illustrating main parts of a vehicle platooning controlling system and a travel assistance system according to a third embodiment of the present invention.

FIG. 9 is an explanatory diagram illustrating positional relations of an intersection, a plurality of vehicles included in the vehicle group in the form of vehicle platooning, and a vehicle that is to join the vehicle group in a state in which the vehicle group has approached the intersection which the vehicles are going to enter. FIG. 10 is an explanation diagram illustrating positional relations of an intersection and a plurality of vehicles included in a vehicle group in the form of vehicle platooning in a case where a new vehicle is assumed to join the vehicle group immediately before the vehicle group enters the intersection. FIG. 11 is a block diagram illustrating main parts of a vehicle platooning controlling system and a travel assistance system according to a third embodiment. A vehicle platooning controlling system $100b$ and a travel assistance system $200b$ according to the third embodiment will be described with reference to FIGS. 9 to 11.

Note that, in FIG. 11, blocks that are similar to those illustrated in FIG. 2 are designated by the same reference numerals, and the description thereof will not be repeated. The hardware configurations of the travel assistance device $4b$ are similar to those explained with reference to FIG. 3 in the first embodiment, and the illustration and the description thereof will not be repeated.

The vehicle platooning controlling system $100b$ supports vehicle platooning which vehicles may freely leave while traveling and which vehicles may freely join while traveling. Thus, as illustrated in FIG. 9, a newly joining vehicle $V_{N+1}$ to join the vehicle group VG may be traveling behind the last vehicle $V_N$ when the vehicle group VG approaches the intersection I that the vehicles are going to enter. The newly joining vehicle $V_{N+1}$ is a vehicle that is traveling by automatic operation and that is to join the vehicle group VG in the near future (for example, immediately before the vehicle group VG enters the intersection I or immediately after the vehicle group VG exits the intersection I).

If the vehicle $V_{N+1}$ joins the vehicle group VG immediately before the vehicle group VG enters the intersection I, the vehicle group VG includes (N+1) vehicles $V_1$ to $V_{N+1}$, and the vehicle $V_{N+1}$ becomes the last vehicle of the vehicle group VG, as illustrated in FIG. 10. As a result of the joining of the vehicle $V_{N+1}$, the vehicle $V_N$ changes from the last vehicle to an intermediate vehicle in the vehicle group VG. The explanation below will be based on a state in which the vehicle $V_{N+1}$ has not joined the vehicle group VG, that is, the state illustrated in FIG. 9.

As illustrated in FIG. 11, the newly joining vehicle $V_{N+1}$ has not joined the vehicle group VG, but includes a radio communication device $1_{N+1}$ and an vehicle platooning controller $3_{N+1}$. Thus, the vehicle platooning controllers $3_1$ to $3_N$ provided in the vehicles $V_1$ to $V_N$ are capable of sharing information on the newly joining vehicle $V_{N+1}$ in addition to the information on the vehicles $V_1$ to $V_N$.

More specifically, the vehicle platooning controllers $3_1$ to $3_N$ share information representing the departure place, places on the routes, the destination, and the travel route of the newly joining vehicle $V_{N+1}$. The vehicle platooning controllers $3_1$ to $3_N$ also share information representing the position, the speed, and the like at which the newly joining vehicle $V_{N+1}$ is traveling.

The vehicle platooning controller $3_N$ provided in the last vehicle $V_N$ has a function of outputting information described below to the travel assistance device $4b$ on the basis of the shared information.

Specifically, the shared information indicates the positions at which the respective vehicles $V_1$ to $V_N$ are traveling, and the position at which the newly joining vehicle $V_{N+1}$ is traveling. The vehicle platooning controller $3_N$ generates information indicating whether or not the newly joining vehicle $V_{N+1}$ is traveling behind the last vehicle $V_N$ on the basis of the position at which the last vehicle $V_N$ is traveling and the position at which the newly joining vehicle $V_{N+1}$ is traveling. When the newly joining vehicle $V_{N+1}$ is traveling behind the last vehicle $V_N$, the vehicle platooning controller $3_N$ generates information indicating the distance between the last vehicle $V_N$ and the newly joining vehicle $V_{N+1}$ on the basis of the position at which the last vehicle $V_N$ is traveling and the position at which the newly joining vehicle $V_{N+1}$ is traveling.

Hereinafter, the information indicating whether or not the newly joining vehicle $V_{N+1}$ is traveling behind the last vehicle $V_N$ and the information indicating the distance between the last vehicle $V_N$ and the newly joining vehicle $V_{N+1}$ will collectively be referred to as "newly joining vehicle information". The vehicle platooning controller $3_N$ outputs the newly joining vehicle information to the travel assistance device $4b$.

The vehicle platooning controller $3_N$ also generates first control information similar to that explained in the first embodiment, and outputs the generated first control information to the travel assistance device $4b$. Alternatively, the vehicle platooning controller $3_N$ generates second control information similar to that explained in the second embodiment, and outputs the generated second control information to the travel assistance device $4b$.

The shared information also indicates the travel routes of the respective vehicles $V_1$ to $V_N$, and also indicates the positions, the speeds, and the like at which the respective vehicles $V_1$ to $V_N$ are traveling. The vehicle platooning controller $3_N$ generates information indicating whether the last vehicle $V_N$ is a right/left turning vehicle or a straight-going vehicle on the basis of the travel route of the last vehicle $V_N$. When the last vehicle $V_N$ is a right/left turning vehicle, the vehicle platooning controller $3_N$ generates information indicating the right/left turning direction, at the intersection I, of the last vehicle $V_N$ on the basis of the travel route of the last vehicle $V_N$, and generates information indicating the timing (that is, lighting-up timing) at which the direction indicator 7 should be turned on because the last vehicle $V_N$ will turn right or left at the intersection I (specifically, the timing at which the distance between the last vehicle $V_N$ and the intersection I becomes a value equal to or smaller than 30 meters, for example) on the basis of the position, the speed, and the like at which the last vehicle $V_N$ is traveling.

Hereinafter, the information indicating whether the last vehicle $V_N$ is a right/left turning vehicle or a straight-going vehicle, the information indicating the right/left turning direction, at the intersection I, of the last vehicle $V_N$, and the information indicating the timing at which the direction indicator 7 should be turned on because the last vehicle $V_N$ will turn right or left at the intersection I will be collectively referred to as "third control information". The vehicle platooning controller $3_N$ outputs the third control information to the travel assistance device $4b$.

An information acquiring unit $5b$ acquires the newly joining vehicle information, the first control information or the second control information, and the third control information output by the vehicle platooning controller $3_N$.

A direction indicator controlling unit $6b$ determines whether or not the newly joining vehicle $V_{N+1}$ is traveling behind the last vehicle $V_N$ when the vehicle group VG approaches the intersection I by using the newly joining vehicle information acquired by the information acquiring unit $5b$, and when the newly joining vehicle $V_{N+1}$ is traveling behind the last vehicle $V_N$, determines whether or not the distance between the last vehicle $V_N$ and the newly joining vehicle $V_{N+1}$ is a value smaller than a threshold.

Note that the threshold may be set to be a variable value depending on the traveling speed of the last vehicle $V_N$ (a value that becomes gradually larger as the traveling speed is higher and becomes smaller as the traveling speed is lower, for example), or a constant value (30 meters, for example) independent of the traveling speed. In a case where the threshold is set to be a variable value, the information acquiring unit $5b$ may acquire information indicating the traveling speed of the last vehicle $V_N$ from the vehicle platooning controller $3_N$, and output the acquired information to the direction indicator controlling unit $6b$.

When the newly joining vehicle $V_{N+1}$ is not traveling behind the last vehicle $V_N$, or when the newly joining vehicle $V_{N+1}$ is traveling behind the last vehicle $V_N$ and the distance between the last vehicle $V_N$ and the newly joining vehicle $V_{N+1}$ is a value equal to or larger than the threshold, the direction indicator controlling unit $6b$ performs the first control by using the first control information acquired by the information acquiring unit $5b$ or performs the second control by using the second control information acquired by the information acquiring unit $5b$.

When the newly joining vehicle $V_{N+1}$ is traveling behind the last vehicle $V_N$ and the distance between the last vehicle $V_N$ and the newly joining vehicle $V_{N+1}$ is a value smaller than the threshold, the direction indicator controlling unit $6b$ performs control to turn on the direction indicator $7$ of the last vehicle $V_N$ as follows by using the third control information acquired by the information acquiring unit $5b$. Specifically, when the last vehicle $V_N$ is a right/left turning vehicle, the direction indicator controlling unit $6b$ performs control (hereinafter referred to as "third control" to turn on the direction indicator $7$ depending on the right/left turning direction, at the intersection I, of the last vehicle $V_N$ at the timing at which the direction indicator $7$ should be turned on because the last vehicle $V_N$ will turn right or left at the intersection I.

The information acquiring unit $5b$ and the direction indicator controlling unit $6b$ constitute the main part of the travel assistance device $4b$. The travel assistance device $4b$ and the direction indicator $7$ constitute the main part of the travel assistance system $200b$.

Next, operation of the travel assistance device $4b$ will be explained with reference to a flowchart in FIG. 12.

First, in step ST41, the information acquiring unit $5b$ acquires the newly joining vehicle information output by the vehicle platooning controller $3_N$. The information acquiring unit $5b$ outputs the acquired newly joining vehicle information to the direction indicator controlling unit $6b$.

Subsequently, in step ST42, the direction indicator controlling unit $6b$ determines whether or not the newly joining vehicle $V_{N+1}$ is traveling behind the last vehicle $V_N$ by referring to the newly joining vehicle information input from the information acquiring unit $5b$ in step ST41. When the newly joining vehicle $V_{N+1}$ is traveling behind the last vehicle $V_N$ (step ST42 "YES"), the direction indicator controlling unit $6b$ determines, in step ST43, whether or not the distance between the last vehicle $V_N$ and the newly joining vehicle $V_{N-1}$ is a value smaller than the threshold by referring to the newly joining vehicle information input from the information acquiring unit $5b$ in step ST41.

Figure 12A:
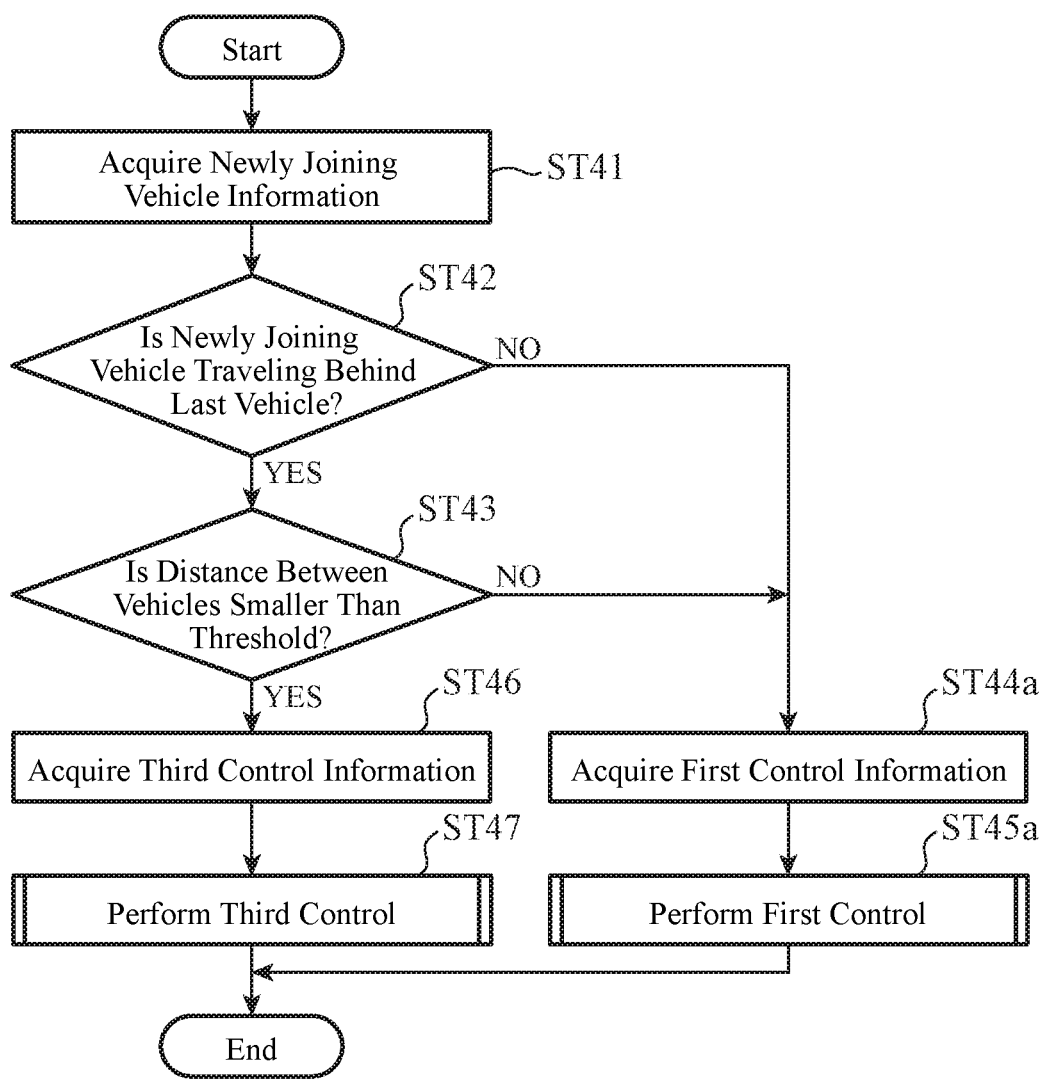
FIG. 12A is a flowchart illustrating operation of a travel assistance device according to the third embodiment of the present invention.
Figure 12B:
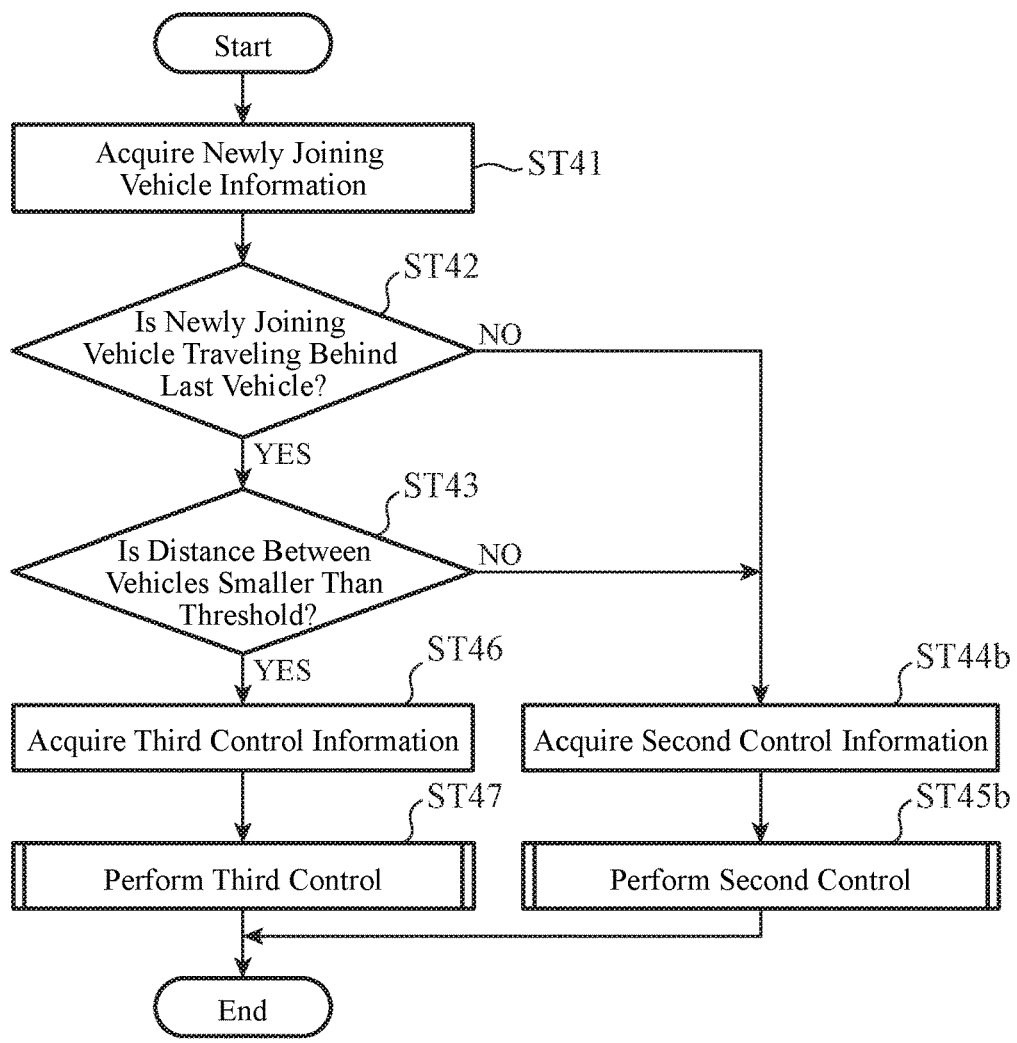
FIG. 12B is a flowchart illustrating other operation of the travel assistance device according to the third embodiment of the present invention.

When the newly joining vehicle $V_{N+1}$ is not traveling behind the last vehicle $V_N$ (step ST42 "NO"), or when the newly joining vehicle $V_{N+1}$ is traveling behind the last vehicle $V_N$ and the distance between the last vehicle $V_N$ and the newly joining vehicle $V_{N+1}$ is a value equal to or larger than the threshold (step ST42 "YES" and step ST43 "NO"), the processing of the travel assistance device $4b$ proceeds to step ST44$a$ illustrated in FIG. 12A or to step ST44$b$ illustrated in FIG. 12B. Specifically, the information acquiring unit $5b$ acquires the first control information and the direction indicator controlling unit $6b$ performs the first control (steps ST44$a$ and ST45$a$), or the information acquiring unit $5b$ acquires the second control information and the direction indicator controlling unit $6b$ performs the second control (steps ST44$b$ and ST45$b$).

Note that the detailed processes of the first control are similar to those explained with reference to the flowchart of FIG. 5 in the first embodiment, the illustration and the explanation thereof will thus not be repeated. In addition, the detailed processes of the second control are similar to those explained with reference to the flowchart of FIG. 8 in the second embodiment, and the illustration and the explanation thereof will thus not be repeated.

When the newly joining vehicle $V_{N+1}$ is traveling behind the last vehicle $V_N$ and the distance between the last vehicle $V_N$ and the newly joining vehicle $V_{N+1}$ is a value smaller than the threshold (step ST42 "YES" and step ST43 "YES"), the information acquiring unit $5b$ acquires, in step ST46, the third control information output by the vehicle platooning controller $3_N$. The information acquiring unit $5b$ outputs the acquired third control information to the direction indicator controlling unit $6b$.

Subsequently, in step ST47, the direction indicator controlling unit $6b$ performs the third control by using the third control information input from the information acquiring unit $5b$ in step ST46.

Figure 13:
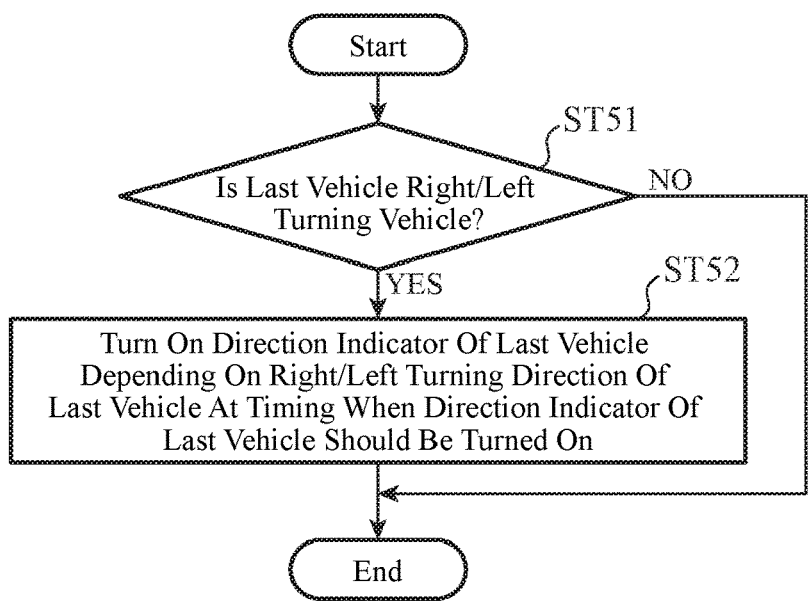
FIG. 13 is a flowchart illustrating detailed processes of third control performed by the travel assistance device according to the third embodiment of the present invention.

Next, detailed processes of the third control in step ST47 will be explained with reference to a flowchart in FIG. 13.

First, in step ST51, the direction indicator controlling unit $6b$ determines whether the last vehicle $V_N$ is a right/left turning vehicle or a straight-going vehicle by referring to the third control information.

When the last vehicle $V_N$ is a straight-going vehicle (step ST51 "NO"), the processing of the direction indicator controlling unit $6b$ is terminated.

When the last vehicle $V_N$ is a right/left turning vehicle (step ST51 "YES"), the direction indicator controlling unit $6b$ refers to the third control information, and waits for the timing at which the direction indicator $7$ should be turned on because the last vehicle $V_N$ will turn right or left at the intersection I. At this timing, the direction indicator controlling unit $6b$ refers to the third control information, and turns on the direction indicator $7$ depending on the right/left turning direction, at the intersection I of the last vehicle $V_N$ (step ST52).

Note that, when the last vehicle $V_N$ has turned right or left after the direction indicator $7$ is turned on in the process of step ST52, the direction indicator $7$ is turned off with returning of the steering wheel. Thus, the control for turning off the direction indicator by the direction indicator controlling unit $6b$ is unnecessary.

The vehicle $V_{N+1}$ is traveling by automatic operation, and travel assistance thereof by the travel assistance system $200b$ is therefore unnecessary. Thus, when the vehicle $V_{N+1}$ is traveling behind the vehicle $V_N$ and the distance between the vehicle $V_N$ and the vehicle $V_{N+1}$ is a value smaller than the threshold, it is highly probable that no subsequent vehicle $V_O$ subjected to the travel assistance performed by the travel assistance system $200b$ is traveling behind the vehicle $V_N$ regardless of whether the vehicle $V_{N+1}$ has not joined or has joined the vehicle group VG. Thus, the first control or the second control for travel assistance performed by the vehicle $V_N$ is canceled, and the direction indicator $7$ is turned on depending on the right/left turning direction of the vehicle $V_N$, which enables unnecessary control for travel assistance to be avoided.

A subsequent vehicle $V_O$, which is not illustrated, may, however, be traveling behind the newly joining vehicle $V_{N+1}$ in a state in which the vehicle group VG has approached the intersection I as illustrated in FIG. 9. Thus, the vehicle platooning controller $3_{N+1}$ provided in the newly joining vehicle $V_{N+1}$ may share similar information with the vehicle platooning controllers $3_1$ to $3_N$ provided in the vehicles $V_1$ to $V_N$, and the travel assistance system 200*b*, which is not illustrated, provided in the newly joining vehicle $V_{N+1}$ may perform the first control or the second control.

Note that the newly joining vehicle information may indicate anything that relates to the newly joining vehicle $V_{N+1}$ and enables the determination processes in steps ST42 and ST43 performed by the direction indicator controlling unit 6*b*.

In addition, the first control information may indicate anything that enables the travel assistance device 4*b* to perform control corresponding to the first control.

In addition, the second control information may indicate anything that enables the travel assistance device 4*b* to perform control corresponding to the second control.

In addition, the third control information may indicate anything that enables the travel assistance device 4*b* to perform control corresponding to the third control.

In addition, the vehicle platooning controlling system 100*b* can employ various modifications similar to those of the vehicle platooning controlling systems 100 and 100*a* according to the first and second embodiments.

As described above, the information acquiring unit 5*b* acquires information on a newly joining vehicle $V_{N+1}$ to join the vehicle group VG, and when the newly joining vehicle $V_{N+1}$ is traveling behind the last vehicle $V_N$ and the distance between the last vehicle $V_N$ and the newly joining vehicle $V_{N+1}$ is a value smaller than the threshold, the direction indicator controlling unit 6*b* turns on the direction indicator 7 of the last vehicle $V_N$ depending on the right/left turning direction, at the intersection I, of the last vehicle $V_N$. This enables the last vehicle $V_N$ to avoid unnecessary control for travel assistance.

Note that the embodiments of the present invention can be freely combined, any components in the embodiments can be modified, and any components in the embodiments can be omitted within the scope of the invention.

INDUSTRIAL APPLICABILITY

A travel assistance device, a travel assistance system, and a travel assistance method according to the present invention can be used for travel assistance of a subsequent vehicle following a vehicle group in the form of vehicle platooning.

REFERENCE SIGNS LIST $1_1$ to $1_N$, $1_{N+1}$: radio communication device, 2: network, $3_1$ to $3_N$, $3_{N+1}$: vehicle platooning controller, 4, 4*a*, 4*b*: travel assistance device, 5, 5*a*, 5*b*: information acquiring unit, 6, 6*a*, 6*b*: direction indicator controlling unit, 7: direction indicator, 11: processor, 12: memory, 13: processing circuit, 100, 100*a*, 100*b*: vehicle platooning controlling system, 200, 200*a*, 200*b*: travel assistance system

The invention claimed is:

1. A travel assistance device for assisting traveling of a subsequent vehicle traveling behind a vehicle group, the vehicle group comprising a plurality of vehicles forming and operating as a vehicle platoon, the travel assistance device being located in a last vehicle of the plurality of vehicles included in the vehicle group, the travel assistance device comprising:

processing circuitry to acquire information indicating right-or-left turning vehicles that turn right or left at an intersection among the plurality of vehicles and information indicating deceleration timing of a forefront right-or-left turning vehicle, the forefront right-or-left turning vehicle being a first vehicle to turn right or left at the intersection from among the right-or-left turning vehicles; and turn on a direction indicator of the last vehicle at the deceleration timing of the forefront right-or-left turning vehicle.

2. The travel assistance device according to claim 1, wherein the processing circuitry acquires information indicating a right-or-left turning direction of the forefront right-or-left turning vehicle, and the processing circuitry turns on the direction indicator of the last vehicle depending on the right-or-left turning direction of the forefront right-or-left turning vehicle at the deceleration timing of the forefront right-or-left turning vehicle.

3. The travel assistance device according to claim 2, wherein the processing circuitry acquires information indicating lighting-up timing of a direction indicator of each of the right-or-left turning vehicles except the forefront right-or-left turning vehicle and information indicating a right-or-left turning direction of each of the right-or-left turning vehicles except the forefront right-or-left turning vehicle, and the processing circuitry turns on the direction indicator of the last vehicle depending on the right-or-left turning direction of each of the right-or-left turning vehicles except the forefront right-or-left turning vehicle at the lighting-up timing of the direction indicator of each of the right-or-left turning vehicles except the forefront right-or-left turning vehicle.

4. The travel assistance device according to claim 3, wherein the processing circuitry acquires information indicating straight-going vehicles that go straight ahead at the intersection among the plurality of vehicles and information indicating right-or-left turning timing of a rearmost right-or-left turning vehicle among the right-or-left turning vehicles, and when the last vehicle is a straight-going vehicle, the processing circuitry turns off the direction indicator of the last vehicle at the right-or-left turning timing of the rearmost right-or-left turning vehicle among the right-or-left turning vehicles.

5. The travel assistance device according to claim 3, wherein the processing circuitry acquires information on a newly joining vehicle to join the vehicle group, and when the newly joining vehicle is traveling behind the last vehicle and a distance between the last vehicle and the newly joining vehicle is a value smaller than a threshold, the processing circuitry turns on the direction indicator of the last vehicle depending on a right-or-left turning direction of the last vehicle at the intersection.

6. The travel assistance device according to claim 2, wherein the processing circuitry acquires information indicating straight-going vehicles that go straight ahead at the intersection among the plurality of vehicles and information indicating right-or-left turning timing of a rearmost right-or-left turning vehicle among the right-or-left turning vehicles, and when the last vehicle is a straight-going vehicle, processing circuitry turns off the direction indicator of the last vehicle at the right-or-left turning timing of the rearmost right-or-left turning vehicle among the right-or-left turning vehicles.

7. The travel assistance device according to claim 2,
wherein the processing circuitry acquires information on a newly joining vehicle to join the vehicle group, and
when the newly joining vehicle is traveling behind the last vehicle and a distance between the last vehicle and the newly joining vehicle is a value smaller than a threshold, the processing circuitry turns on the direction indicator of the last vehicle depending on a right-or-left turning direction of the last vehicle at the intersection.

8. The travel assistance device according to claim 1,
wherein the processing circuitry acquires information indicating a right-or-left turning direction of a rearmost right-or-left turning vehicle among the right-or-left turning vehicles, and
the processing circuitry turns on the direction indicator of the last vehicle depending on the right-or-left turning direction of the rearmost right-or-left turning vehicle among the right-or-left turning vehicles at the deceleration timing of the forefront right-or-left turning vehicle among the right-or-left turning vehicles.

9. The travel assistance device according to claim 8,
wherein the processing circuitry acquires information indicating straight-going vehicles that go straight ahead at the intersection among the vehicles and information indicating right-or-left turning timing of the rearmost right-or-left turning vehicle among the right-or-left turning vehicles, and
when the last vehicle is a straight-going vehicle, the processing circuitry turns off the direction indicator of the last vehicle at the right-or-left turning timing of the rearmost right-or-left turning vehicle among the right-or-left turning vehicles.

10. The travel assistance device according to claim 8,
wherein the processing circuitry acquires information on a newly joining vehicle to join the vehicle group, and
when the newly joining vehicle is traveling behind the last vehicle and a distance between the last vehicle and the newly joining vehicle is a value smaller than a threshold, the processing circuitry turns on the direction indicator of the last vehicle depending on a right-or-left turning direction of the last vehicle at the intersection.

11. A travel assistance system for assisting traveling of a subsequent vehicle traveling behind a vehicle group, the vehicle group comprising a plurality of vehicles forming and operating as a vehicle platoon, the travel assistance system being at least partly located in a last vehicle of the plurality of vehicles included in the vehicle group, the travel assistance system comprising:
processing circuitry to
acquire information indicating right-or-left turning vehicles that turn right or left at an intersection among the plurality of vehicles and information indicating deceleration timing of a forefront right-or-left turning vehicle, the forefront right-or-left turning vehicle being a first vehicle to turn right or left at the intersection from among the right-or-left turning vehicles; and
turn on a direction indicator of the last vehicle at the deceleration timing of the forefront right-or-left turning vehicle.

12. A travel assistance method for assisting traveling of a subsequent vehicle traveling behind a vehicle group, the vehicle group comprising a plurality of vehicles forming and operating as a vehicle platoon, the travel assistance method being performed in a last vehicle of the plurality of vehicles included in the vehicle group, the travel assistance method comprising:
acquiring, information indicating right-or-left turning vehicles that turn right or left at an intersection among the plurality of vehicles and information indicating deceleration timing of a forefront right-or-left turning vehicle, the forefront right-or-left turning vehicle being a first vehicle to turn right or left at the intersection from among the right-or-left turning vehicles; and
turning on, a direction indicator of the last vehicle at the deceleration timing of the forefront right-or-left turning vehicle.

* * * * *